United States Patent Office 3,144,811
Patented Aug. 18, 1964

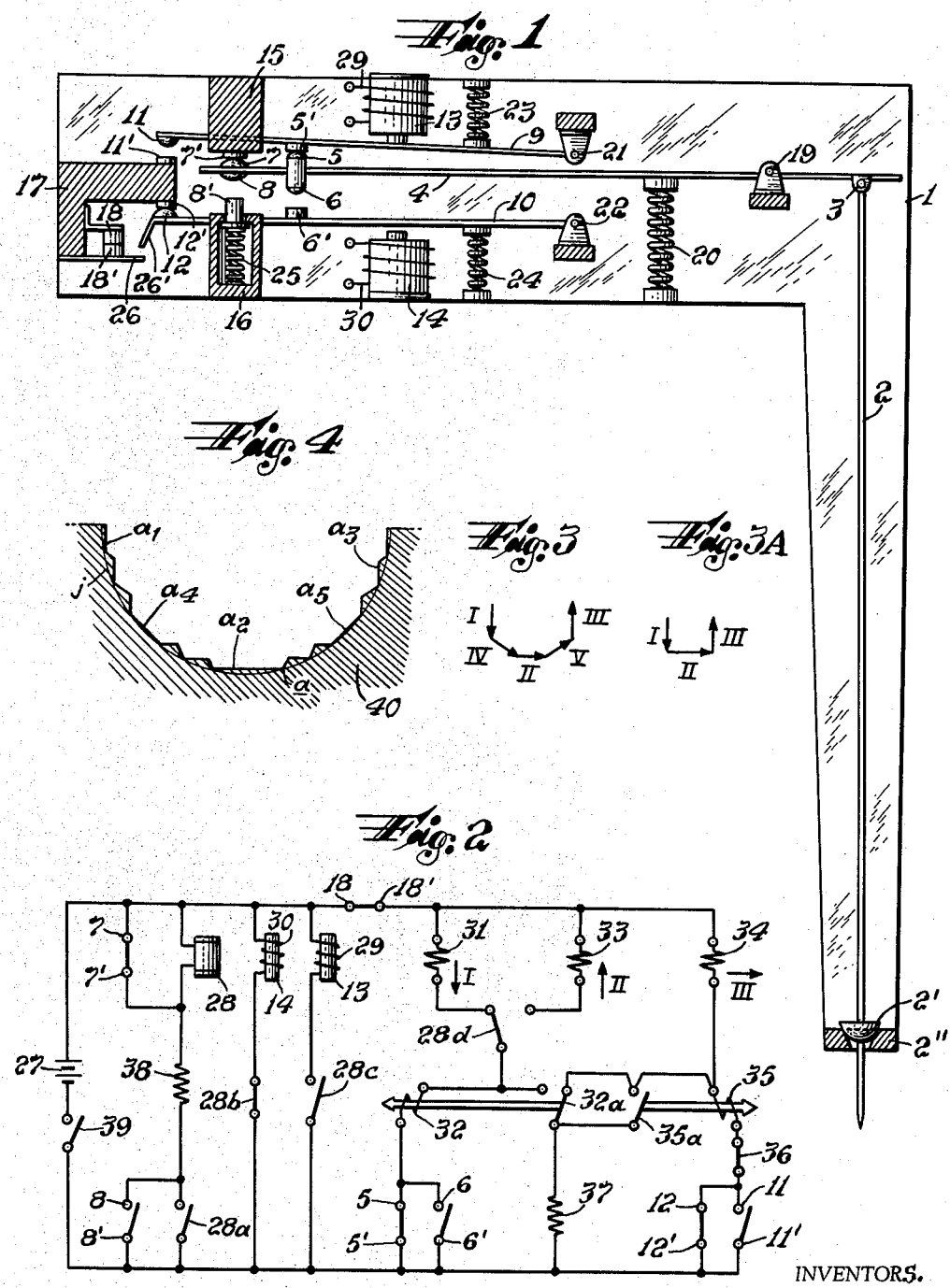

3,144,811
PATTERN SENSING ARRANGEMENT FOR A
CUTTING MACHINE TOOL
František Janas and Jan Sedláček, Gottwaldov, Czechoslovakia, assignors to Zavody presneho strojirenstvi Gottwaldov, narodni podnik, Gottwaldov, Czechoslovakai
Filed May 2, 1962, Ser. No. 191,783
16 Claims. (Cl. 90—62)

This invention relates to copying or duplicating machine tools, and particularly to a pattern sensing arrangement for a cutting machine tool such as a milling machine or a lathe.

In machine tools for copying or duplicating a pattern or model, there is usually supplied a sensing stylus or tracer which scans the contour of a pattern or model while a cutting tool produces the desired shape in a work piece. The relative movements of the tool and work piece are coupled to the relative movements of the stylus or sensing member and the pattern or model so that the movements of the tool in the work piece cut a surface duplicating that of the pattern or model.

In conventional, electrically operated copying machine tools the drive for relative displacement of tool and work piece is energized in response to the opening and closing of electrical switches by the sensing stylus. The stylus is movably mounted on a support which moves with the tool. One contact of a switch is arranged on the support and the other on the stylus. Movement of the stylus relative to the support is actuated by abutment of the stylus against a surface of the pattern while the support moves.

If a conventional sensing arrangement of this type is applied to the cutting of a recess the walls of which arcuately descend on one side to the bottom of the recess, and ascend arcuately on the other side of the bottom as in a recess of semi-circular cross section, it is found that an elliptically distorted recess is obtained from a semi-circular pattern. The descending wall is reproduced accurately with a good conventional sensing device, but the ascending wall is cut too deeply. The surface obtained lies outside the desired circular arc.

Cutting of a semi-circular recess or of any similar shape requires a drive capable of advancing a tool in three directions, namely inward to the work piece, outward of the work piece and transversely of the two first-mentioned directions. The three movements will be referred to hereinafter as in-feeding, out-feeding, and cross feeding. It is conventional to provide a sensing stylus, or a separate contact carrier connected to the stylus with two sets of movable contacts facing in opposite directions for closing circuits in cooperation with mating contacts fixedly mounted on the support and normally spaced from the movable contacts in such a manner that movement of the contact carrier in one direction will close the circuits of one set of contacts, and movement in the opposite direction will close the circuits of the other set of contacts.

While tracing the arcuately descending side of a semi-circular pattern, the tracing stylus alternatingly opens and closes circuits which actuate in-feeding and cross-feeding. It thus moves alternatingly toward and away from one set of stationary contacts. In a modern duplicating milling machine, the contact carrier may perform as many as twenty reciprocating contact-opening and contact-closing movements per second. The milling tool does not actually cut a smooth curved contour into the work piece but a sequence of flat facets or steps which are angularly offset relative to each other, each opening or closing of a set of contacts corresponding to a change in cutting direction. The small surface imperfections resulting from this mode of action are unavoidable and not usually objectionable.

The distortion of the copied pattern by conventional sensing arrangements has been found to be of a different nature and due to another factor. It is necessary for safe operation of the electrical switches actuated by the sensing stylus, that the contact carrier in its reciprocating movement toward and away from one set of fixed contacts stay at a safe distance from the other set of fixed contacts. During its cooperation with the first mentioned set of contacts, the contact carrier thus swings within an area quite close to the first set of contacts, and remote from the other set. If the first set of contacts controls in-feeding, the second set will control out-feeding and will come into play during cutting of the ascending wall of the recess. Shifting of the contact carrier from a condition of cooperation with the first contact set to cooperation with the second contact set involves a shifting of the range of reciprocating contact carrier movement to an area relatively remote from the first set of contacts, and adjacent the second set. The center of movement of the contact carrier shifts correspondingly relative to the support on which the sensing arrangement is mounted, and the precise spatial correlation between pattern and tool if established during cutting of the descending recess wall, is lost during cutting of the ascending wall. The contour milled in the work piece is off-set relative to the desired outline.

The resulting error is of a magnitude substantially exceeding the random error caused by the stepwise cutting which so far is unavoidable in high production machine tools. Depending on variables inherent in the machine and the work to be done, this random error may cause localized deviations from the desired outline of a magnitude of 25 to 500 microns, and can usually be repaired if necessary. The elliptic distortion of the shape of a recess may reach substantially higher values under comparable conditions, and is not usually repairable.

It has been attempted to remedy the well-known elliptic distortion. Some solutions of the problem proposed heretofore involve a reduction in the feed rate of the machine tool by an amount not usually tolerable. Others require equipment of great complexity. Known remedial devices which do not significantly interfere with machining speeds and are relatively simple to build and operate have not been fully effective in providing faithful duplicates of a pattern or model.

The main object of this invention is the provision of a simple and reliable sensing or tracing arrangement for controlling the feed drive of a duplicating machine tool according to the contour of a sensed pattern or model which causes faithful reproduction of the pattern by the machine tool.

Another object is the provision of such a sensing arrangement which is relatively simple and reliable in its operation.

A further object is the provision of a sensing arrangement which is entirely automatic and does not rely on the skill of an operator.

With these and other objects in view, the invention in one of its aspects consists in a sensing arrangement for a cutting machine tool such as a milling machine, lathe, or the like, which includes a support to be connected to the cutting tool for joint movement while the tool cuts a work piece. A primary switch actuator and two secondary switch actuators are movably mounted on the support. Actuating means are provided for moving the secondary actuators toward and away from respective predetermined positions adjacent the primary actuator. A stylus is mounted on the support for scanning a pattern when the support moves relative to the pattern. The stylus moves on the support responsive to engagement with the pattern and is connected to the afore-mentioned primary switch actuator for moving the same relative to the secondary switch actuators.

This stylus-driven movement leads the primary actuator toward and away from a normal position relative to each secondary actuator in which the first actuator engages the respective secondary actuator when the same is in its predetermined position. The relative movement of the switch actuators operates contact means which are conductively connected to circuit means for controlling movement of the support relative to the pattern.

The exact nature of this invention, as well as other objects and advantages thereof will be readily apparent from consideration of the following specification relating to the annexed drawing in which:

FIG. 1 is an elevational view, partly in section, of the mechanical elements of the sensing arrangement of the invention;

FIG. 2 is a wiring diagram of the sensing arrangement including those circuit elements of an otherwise conventional copying milling machine which are controlled by the mechanical device illustrated in FIG. 1;

FIGS. 3 and 3A are diagrams indicating the directions of milling machine movements actuated by the sensing arrangement of the invention in two operative conditions of the tracing arrangement;

FIG. 4 shows a work piece that has been milled on a milling machine equipped with the tracing arrangement of the invention, the view being in section.

Referring now to the drawing in detail, and initially to FIG. 1, there is seen a casing 1 which supports the mechanical working elements of the tracing device of the invention and is connected with the cutting tool of a copying milling machine for joint movement in a manner well known in itself. The milling machine with which the sensing arrangement of the invention cooperates may be of the type disclosed in U.S. Patent 2,828,673 to P. J. Campbell.

The sensing device includes a stylus or sensing rod 2 which is longitudinally movable and pivotable on the casing 1 by means of a bearing arrangement which includes a hemi-spherical member 2' on the rod 2 and a fixed support 2" having a downwardly tapering conical passage engaging the member 2'. Any lateral displacement of the rod 2 thus causes upward movement of the same. The free lower end or tip of rod 2 follows the contour of a pattern in the usual manner, the other end is hinged to one arm of a lever 4 by means of a universal joint 3.

The lever 4 is pivoted on a bearing 19 and urged by a compression spring 20 to move in such a manner that the rod 2 approaches the surface of the pattern. The other arm of the lever carries two pairs of contacts 5, 6 and 7, 8. The members of each pair are arranged on opposite sides of the lever 4 for alternate cooperation with other contacts depending on the angular position of the arm 4. Except as specifically stated otherwise, the several contacts on the lever 4 and other contacts described hereinafter are insulated from the supporting structures.

Two electromagnets 13, 14 are mounted on the casing 1 on opposite sides of the lever 4. The magnet 13 has a coil 29 with magnetizable core and a resilient armature rod 9 which is a one-armed lever hinged to the casing 1 by a pivot 21. The armature rod 9 carries two contacts 5' and 11 and is urged by a compression spring 23 away from the relay core toward a position in which the contact 5' on the armature rod 9 and the contact 5 on the lever 4 close a circuit. A bracket 17, fixedly mounted on the casing 1 carries a contact 11'. Movement of the armature rod 9 under the urging of the spring 23 is limited by circuit closing abutment of the contact 11 on the armature rod against the fixed contact 11' on the bracket 17.

The magnet 14 is equipped in a similar manner with a coil 30 having a magnetizable core, and a resilient armature rod 10 which is urged to pivot away from the coil 30 on a pivot 22 by a compression spring 24. This movement is limited by abutment of a contact 12 on the armature rod 10 against a fixed contact 12' on the aforementioned bracket 17.

The bracket 17 furthermore carries a fixed safety contact 18 and a movable safety contact 18' which is arranged on a leaf spring 26 attached to the bracket 17. A lug 26' on the free end of the armature rod 10 is capable of engaging the leaf spring 26 and of interrupting a circuit between the contacts 18 and 18' if the free end of the armature rod 10 is deflected beyond the position it assumes when attracted by the magnet 14. A contact 6' is mounted on the armature rod 10 between the afore-mentioned free end and that portion of the rod 10 which makes contact with the core of the magnet 14 when the latter is energized to attract the armature rod 10. The contact 6' is aligned for engagement with the contact 6 on the lever 4.

Two contacts 7' and 8' are mounted on respective bases 15, 16 fixedly fastened on the casing 1 on opposite sides of the lever 4. The contact 7' is fixed on its base 15 and abuttingly engages the contact 7 under the pressure of the spring 20 in the inoperative position of the device illustrated in FIG. 1. Pivoting movement of the lever 4 away from the illustrated position engages the contact 8 on the lever 4 with the contact 8' on the base 16. The latter contact is movable inward of the base 16 against the pressure of a spring 25 so that movement of the lever 4 beyond a position of first engagement with the contact 8' is opposed, but not immediately stopped.

In the inoperative position of the apparatus, the contacts 5,5' constitute a closed switch, and normally closed switches are similarly constituted by the paired contacts 7—7', 12—12', 18, 18'. The paired contacts 6—6', 8—8', 11—11' constitute respective normally open switches. The spring 20 is so dimensioned as to overcome the pressure of the spring 23 and normally to close switches 5—5', 7—7', while opening switch 11—11'.

The electrical circuit connecting the several switches and magnets shown in FIG. 1 with each other, with additional circuit elements of the sensing arrangement, and with actuating elements of the milling machine is illustrated by the diagram of FIG. 2.

There is shown a current source 27 provided with a main switch 39. Six branch circuits are arranged in parallel with the source 27 and its switch 39. In the first branch circuit, a relay 28 is arranged in series with a current limiting resistor 38 and the normally open switch 8—8'. The normally closed switch 7—7' forms a short circuit across the terminals of the relay 28. The relay is equipped with normally open switches 28a, 28c, a normally closed switch 28b, and with a two-position selector switch 28d. The switch 28a is shunted across the switch 8—8' to provide a holding circuit that will keep the relay 28 energized regardless of the position of the switch 8—8'.

The normally closed switch 28b of the relay 28 is arranged in the second branch circuit in series with the coil 30 of the magnet 14. The normally open switch 28c of the relay 28 in series with the coil 29 of the magnet 13 constitutes the third branch circuit energized by the source 27.

The fourth and fifth branch circuits respectively include the windings 31 and 33 of two electromagnetic clutches on the milling machine which, when energized, actuate in-feeding and out-feeding movements of the milling tool relative to a work piece in a manner well known in itself. The in-feeding movement causes the tool to move inward of the work piece, and the sensing rod 2 to move inward of a reference face on the pattern. The opposite movement of tool and tracer rod relative to the work piece and to the pattern is referred to as out-feeding. In-feeding movement is indicated in the drawing by Roman numeral I and a downwardly pointing arrow, out-feeding by an upwardly pointing arrow and Roman numeral II.

The clutch windings 31, 33 are permanently connected to one pole of the source 27 as long as the safety switch 18—18' is closed. They are alternatively connected to the main switch 39 by the selector switch 28d and a series circuit which includes a relay 32 and the normally closed switch 5—5'. The normally open switch 6—6' is shunted across the contacts 5, 5'. The ohmic resistance of the relay 32 is high enough to permit passage of relay actuating current through the relay 32 and either clutch winding 31, 33 without energizing the connected clutch.

The sixth branch circuit consists of the winding 34 of an electromagnetic clutch of the milling machine which actuates cross-feeding of the rod 2 and of the milling machine tool relative to the work piece and the pattern as indicated by the arrow III, of a relay 35, a manual switch 36, and of the normally closed switch 12—12'. The normally open switch 11—11' is shunted across the contacts 12, 12'.

The selector switch 28d is normally in a position in which it connects the clutch winding 31 to the relay 32. The latter relay actuates a selector switch 32a which normally connects the winding 34 to the main switch 39 through a current limiting resistor 37. When the relay 32 is energized, the selector switch 32a connects the source 27 through the resistor 37 to that clutch winding 31 or 33 which is selected by the switch 28d.

The relay 35 has a normally open switch 35a which, when closed, connects the clutch winding 34 through the resistor 37 to the main switch 39 of the source 27.

The operation of the tracing arrangement described will now be set forth with reference to FIG. 4.

Since the pattern and the milled shape of the work piece closely agree, the pattern itself has not been illustrated. Its semi-circular outline $j$ has been superimposed on the work piece 40. If the milling tool could cut a shape exactly reproducing the pattern, the milled surface would be defined by the semi-circular line $j$. The actually milled surface of the work piece 40 is represented by the section line $a$. The milling tool is mover relative to the work piece along the line $a$ in the following manner:

When the main switch 39 is closed, the coil 30 of the magnet 14 is energized. The armature rod 10 is attracted and the contact 12—12' is opened. In the attracted position of the armature rod 10, the lug 26' touches the leaf spring 26, but does not open the safety switch 18—18'.

The relay 32 is energized so that the switch 32a is positioned to feed current through the resistor 37 to the clutch winding 31 for in-feeding while disconnecting the cross-feeding clutch winding 34. The sensitivity of the relay 32 is sufficient to keep it energized although shunted by the resistor 37. In-feeding of the milling tool and of the sensing rod 2 begins. The direction of in-feeding is represented by arrow I in FIG. 3, and section $a_1$ of line $a$ in FIG. 4 is produced by in-feeding tool movement.

When the sensing rod 2 during in-feeding movement of the casing 1 abuts against the pattern, the lever 4 is pivoted counter-clockwise, as viewed in FIG. 1, against the restraint of the spring 20. The armature rod 9 initially participates in this movement of the lever 4 under the pressure of the spring 23. The switch 7—7' is opened. Since switch 8—8' is still open, opening of the switch 7—7' does not energize the relay 28. The in-feeding movement continues in the direction of the arrow I, and the contact 11 on the armature rod 9 touches the fixed contact 11' on the bracket 17. The movement of the armature rod 9 is stopped, and the relay 35 is energized.

The resulting closure of the switch 35a actuates the cross-feeding clutch winding 34. Movement of the milling tool and the corresponding movement of the sensing rod 2 proceeds simultaneously in the in-feeding direction I and in the cross-feeding direction II. (See FIG. 3.) There results an oblique movement IV represented in FIG. 4 by obliquely downward sloping portions $a_4$ of the work piece surface.

In the course of movement IV, the sensing rod 2 would lose contact with the pattern if the lever 4 were not moved clockwise by the spring 20. This clockwise movement opens the switch 11—11', whereby the relay 35 is deenergized and the clutch 34 is deactivated. Cross-feeding stops, but in-feeding continues, until the switch 11—11' is again closed.

The rotating milling tool thus cuts into the work piece 40 a surface which consists of alternating in-feeding cuts $a_1$ and oblique surface portions $a_4$ produced during simultaneous in-feeding and cross-feeding. The switch 5—5' remains closed during the operations so far described, and the switch 6—6' remains open.

Eventually the decreasing slope of the semi-circular pattern surface becomes parallel to the direction IV. When the tip of the sensing rod reaches and passes this pattern portion, travel of the casing 1 in the direction IV does not tend to remove the sensing rod tip from the pattern. Eventually, counterclockwise pivoting movement of the lever 4 continues even after the mechanism has started to move in the direction IV, and switch 5—5' opens.

Relay 32 releases the selector switch 32a to its inoperative position in which the in-feeding clutch is deenergized, but cross feeding in direction II (FIG. 3) continues. The resulting inward movement of the sensing rod 2 which follows the inward slope of the pattern rotates the lever 4 counterclockwise, opens the switch 5—5' and restores movement IV. Closing and opening of switch 5—5' then alternate and cause corresponding tool movements in directions IV and III, until the tip of the sensing rod passes the central plane of symmetry of the semi-circular pattern causing corresponding surfaces $a_2$ to be willed during pure cross-feeding.

Cross-feeding in direction II causes counterclockwise movement of the lever 4 until the switch 8—8' is closed. It will be recalled that switch 7—7' is open. The closing of the switch 8—8' energizes the relay 28 which attracts its armature and closes its holding switch 28a. The switch 28b is opened, whereby the coil 30 of the magnet 14 is released and switches 6—6' and 12—12' are closed. Switch 28c is closed and the coil 29 of magnet 13 is energized. Switch 11—11' is opened. Switch 28d is switched from its in-feeding position in which it connects the clutch winding 31 to the main switch 27 to the out-feeding position in which it similarly connects the clutch winding 33.

The simultaneous opening of switch 11 and closing of switch 12 leaves the apparatus in condition for cross-feeding, while closing of switch 6—6' energizes relay 32 and causes switch 32a to connect the out-feeding clutch winding 33 to the main switch 39 through the current limiting resistor 37. The casing 1 together with the milling tool and the sensing rod 2 is fed relatively to the work piece or to the pattern in a cross-wise and outward direction in a movement represented by arrow V in FIG. 3, and by the corresponding obliquely upwardly sloping portions $a_5$ of the outline $a$ in FIG. 4.

When movement in the direction V first occurs, it would cause the tip of the sensing rod 2 to move away from the pattern surface if the spring 20 were not present. The spring turns the lever 4 clockwise, and switch 6—6' is opened, causing relay 32 to be deenergized. The out-feeding clutch winding 33 is cut off from the main switch 39 while cross feeding continues. Movements in directions II and V thus alternate until the tip of the sensing rod 2 passes that portion of the ascending outline $a$ which is parallel to the movement V.

At this stage, oblique movement V leads the sensing rod 2 closer to the pattern surface and the lever 4 is further deflected counterclockwise. Such movement is opposed, but not prevented by the spring 25 backing the contact 8', and the switch 12—12' is opened, whereby cross-feeding is stopped, and the milling tool and the sensing rod 2 move outward in the direction III to cut surfaces $a_3$. When such outward movement sufficiently pivots the lever 4 in a clockwise direction, the switch 12—12' is again closed and oblique movement in the direction V is resumed.

Eventually, the slope of the pattern becomes parallel to the direction of out-feeding, and milling of a cavity of semi-circular shape is completed.

If for any reason, such as machine failure or operator's carelessness, the sensing rod 2 should move beyond the position corresponding to normal out-feeding, the armature rod 10 is deflected by the contact 6 until its lug 26' flexes the leaf spring 26 and opens the safety switch 18—18'. This deenergizes all clutches and stops relative movement of the milling tool and of the work piece.

If a plain pattern is to be copied in which straight walls intersect at right angles, the oblique movements IV and V would not serve any useful purpose. The switch 36 may be opened when copying such patterns, thereby permanently deenergizing the relay 35 and opening the switch 35a. The cross-feeding clutch winding 34 can then be energized only by the selector switch 32a. When the cross-feeding clutch is inactive, either the infeeding clutch winding 31 or the out-feeding clutch winding 33 may be energized, depending on the position of the selector switch 32a.

In the light of the afore-described operation of the sensing arrangement of the invention, the elements of the sensing arrangement may be briefly described as follows:

The lever 4 constitutes a primary movable contact carrier or switch actuator the movements of which are directly actuated by the relative movement of the casing 1 and the pattern. Since the milling machine tool is attached to the casing 1 or otherwise connected thereto for joint movement, the lever 4 directly responds to relative movement of the tool and the pattern.

The armature rods 9, 10 constitute secondary movable contact carriers or switch actuators. Their movements are actuated by the primary switch actuator if the armature rods are in their operative position, that is, the position in which the rods are released by their respective magnets 13, 14.

The switches 5—5' and 6—6' are the main control switches of the sensing arrangement. Each main control switch independently provides selection between cross feeding and in- or out-feeding by means of the main control relay 32.

The switches 7—7', 8—8' cooperate as reversing switches for selection between in- and out-feeding by operation of the reversing relay 28.

The switches 11—11' and 12—12' are auxiliary switches which permit simultaneous cross-feeding during in- or out-feeding by control of the auxiliary relay 35.

The range of movement of the primary contact carrier 4 in normal sensing operation of the apparatus illustrated is limited to the distance necessary for opening an auxiliary switch and the corresponding main control switch. Assuming the apparatus of FIG. 1 to be in a normal position in which the switches 11—11' and 5—5' are closed, the total pivotal movement of the lever 4 on the bearing 19 need not exceed a clockwise arc greater than the minimum required for breaking contact in the switch 11—11', and a counterclockwise arc of the minimum length required for breaking contact in the switch 5—5'. At the low voltages at which relay arrangements of the type disclosed are customarily operated, and which need not exceed 10 volts, the contact opening gaps are minute. No safety margin need be provided in the movement range itself against accidental abutment with contacts of the other main and auxiliary switches since the temporarily inactive secondary contact carrier is safely swung away by its magnet.

The magnetic control over the movement of the two secondary contact carriers permits complete superposition of the respective ranges of movement of the primary contact carrier in cooperation with the two secondary contact carriers. This is simply achieved by selecting the dimensions of the contacts 5, 5', 6, 6'.

It is further to be noted that the main control contacts 5' and 6' are located on the respective secondary contact carriers 9, 10 between the fulcra of the respective bearings 21, 22 and the auxiliary contacts 11, 12. Because of the mechanical advantage gained by the leverage of the rods 9, 10, the movement of the contacts 5, 6 during operation of the apparatus need be increased by less than the width of one normal contact breaking gap in order safely to actuate the auxiliary switches 11—11', 12—12'.

Similar leverage advantages are obtained by mounting the contacts 5, 6 on the lever 4 at a distance from the bearing 19 which is a multiple of the distance between the bearing 19 and the universal joint 3.

The several features of the invention cooperate to eliminate completely any shifting in the center of the unavoidable reciprocating movement of the lever 4 and of the stylus 2 when the latter moves from the descending to the ascending portion of the pattern outline $j$. The amplitude of the reciprocating movement is reduced to a minimum. While a milling machine equipped with the sensing device of the invention still cannot cut a truly curved contour, the angularly offset facets of the cut surface follow the ideal contour more closely than is possible with known devices of comparable simplicity and ruggedness.

While an embodiment of the invention has been described in cooperation with the drive system of a known milling machine, the invention is not limited to the specific type of milling machine referred to, nor to any specific machine tool. It is evident that a lathe may be controlled to copy a pattern or model by a sensing device which differs from that illustrated and described only by such details as would be obvious to those skilled in the art.

It should be understood, therefore, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A sensing arrangement for a machine tool, comprising, in combination, (a) a support adapted to be connected to a cutting tool for joint movement therewith while said tool cuts a work piece;

(b) a primary switch actuator movably mounted on said support;

(c) two secondary switch actuators movably mounted on said support;

(d) actuating means for moving each of said secondary switch actuators toward and away from a respective predetermined position adjacent said primary switch actuator;

(e) stylus means mounted on said support for scanning a pattern when said support moves relative to said pattern, said stylus means being movable on said support responsive to engagement with the pattern scanned, and connected to said primary switch actuator for moving the same relative to each of said secondary switch actuators toward and away from a normal position in which said first switch actuator engages the respective secondary switch actuator when the same is in said predetermined position thereof;

(f) contact means operative responsive to relative movement of said primary and secondary switch actuators; and (g) circuit means conductively connected to said contact means for controlling movement of said support relative to said pattern.

2. An arrangement as set forth in claim 1, wherein said stylus means is connected to said primary actuator for moving the same relative to each of said secondary actuators from said normal position in a first direction away from said respective secondary actuator while the latter is in said predetermined position thereof, and in a second direction different from said first direction, said primary switch actuator during movement in said second direction displacing said respective secondary swtich actuator from said predetermined direction thereof; and wherein said contact means includes two main switch means operative responsive to engagement of said primary switch actuator with respective ones of said secondary switch actuators; two auxiliary switch means operative responsive to movement of respective ones of said secondary switch actuators toward and away from the respective predetermined positions thereof; and reversing switch means operative responsive to movement of said primary switch actuator from said normal position thereof relative to one of said secondary switch actuators in said second direction.

3. An arrangement as set forth in claim 2, wherein said second direction is opposite to said first direction.

4. An arrangement as set forth in claim 2, wherein said first direction of movement of said primary actuator relative to one of said secondary actuators substantially coincides with the second direction of movement of said primary actuator relative to the other secondary actuator.

5. An arrangement as set forth in claim 1, wherein said actuating means include electromagnetic means for selectively moving one of said secondary actuators away from said predetermined position thereof, said circuit means being conductively connected to said electromagnetic means for energizing the same responsive to the operation of said contact means.

6. An arrangement as set forth in claim 1, wherein said actuating means include two electromagnetic means for respectively moving said secondary actuators away from the predetermined positions thereof, said circuit means being conductively connected to said two electromagnetic means for alternatively energizing the same responsive to the operation of said contact means.

7. An arrangement as set forth in claim 1, wherein one of said switch actuators is pivotally fastened to said support.

8. An arrangement as set forth in claim 7, wherein said one switch actuator is a lever member.

9. An arrangement as set forth in claim 8, wherein a portion of said contact means is mounted on said lever member.

10. An arrangement as set forth in claim 1, wherein each of said switch actuators includes a lever member pivotally fastened to said support.

11. An arrangement as set forth in claim 1, wherein said actuating means include resilient means permanently urging each of said secondary switch actuators into the respective predetermined positions thereof, and electromagnetic means for selectively moving said secondary actuators away from said predetermined positions, said circuit means being conductively connected to said electromagnetic means for alternatively energizing the same responsive to the operation of said contact means.

12. An arrangement as set forth in claim 11, including abutment means for limiting movement of said secondary switch actuators by said resilient means into said predetermined positions.

13. An arrangement as set forth in claim 1, wherein said circuit means includes a plurality of magnetic clutch means.

14. A sensing arrangement for a machine tool, comprising, in combination,
(a) a support;
(b) stylus means mounted on said support for scanning a pattern when said support moves relative to said pattern;
(c) a two-armed lever pivotally mounted on said support and constituting a primary switch actuator, one arm of said lever being connected to said stylus means for joint movement therewith;
(d) two lever members constituting respective secondary switch actuators and pivotally mounted on said support on opposite sides of said primary actuator for movement toward and away from respective predetermined positions adjacent said primary actuator;
(e) resilient means permanently urging said secondary actuators into said predetermined positions;
(f) two electromagnetic means for moving said secondary actuators away from said predetermined positions against the urging of said resilient means, said primary actuator being movable relative to each of said secondary actuators for engagement therewith when the respective secondary actuator is in said predetermined position; and
(g) main switch means responsive to engagement of said primary actuator with each of said secondary actuators for controlling movement of said support relative to said pattern.

15. An arrangement as set forth in claim 14, wherein said primary switch actuator is further movable by said stylus means while in engagement with each of said secondary switch actuators in a direction for moving the engaged secondary switch actuator from said predetermined position thereof against the urging of the respective resilient means; said electromagnetic means each include an electromagnet having a coil; said arrangement further comprising a relay having a coil and three switches operated by said coil; two reversing switches respectively operative responsive to said further movement of said primary switch actuator; a source of electric current; and conductive means connecting to said source a first branch circuit including one of said reversing switches and the coil of said relay arranged in parallel and serially connected with the other one of said reversing switches and one of the three switches of said relay, said other reversing switch and said one relay switch being arranged in parallel; a second and a third branch circuit each including in series the coil of one of said electromagnets and one of the other two switches of said relay, said branch circuits being connected to said source in parallel.

16. An arrangement as set forth in claim 15, wherein said relay additionally has a selector switch, said arrangement further comprising first conductor means connecting said selector switch to one pole of said source, second and third conductor means connected to said selector switch for selectively connecting said first conductor means to a respective drive means for moving said support relative to said pattern in different directions; and fourth conductor means for connecting the other pole of said source to said drive means.

References Cited in the file of this patent
UNITED STATES PATENTS

| | | |
|---|---|---|
| 2,810,327 | Schmid | Oct. 22, 1957 |
| 2,863,363 | Schmid | Dec. 9, 1958 |